United States Patent [19]

Arndt

[11] Patent Number: 4,885,916

[45] Date of Patent: Dec. 12, 1989

[54] BUS AIR CONDITIONING UNIT

[75] Inventor: Warren D. Arndt, Roseville, Minn.

[73] Assignee: Thermo King Corporation, Minneapolis, Minn.

[21] Appl. No.: 311,508

[22] Filed: Feb. 16, 1989

[51] Int. Cl.$^4$ ............................................. B60H 1/32
[52] U.S. Cl. .............................. 62/244; 62/DIG. 16
[58] Field of Search .................. 62/244, DIG. 16, 429

[56] References Cited

U.S. PATENT DOCUMENTS

| | | | |
|---|---|---|---|
| 2,033,983 | 3/1936 | Greenwald et al. | 62/102 |
| 2,054,350 | 9/1936 | Weiland | 62/244 |
| 2,115,295 | 4/1938 | Woodruff | 62/115 |
| 2,184,354 | 12/1939 | Levine | 62/140 |
| 2,780,929 | 2/1957 | Roseman | 62/129 |
| 3,848,428 | 11/1974 | Rieter, Jr. | 62/285 |
| 4,043,143 | 8/1977 | Fluder et al. | 62/244 X |
| 4,102,148 | 7/1978 | Matthews et al. | 62/429 X |
| 4,134,275 | 1/1979 | Erickson et al. | 62/244 |
| 4,144,719 | 3/1979 | Williams et al. | 62/244 X |
| 4,641,502 | 2/1987 | Aldrich et al. | 62/244 |
| 4,727,728 | 3/1988 | Brown | 62/244 |
| 4,748,825 | 6/1988 | King | 62/244 |
| 4,787,210 | 11/1988 | Brown | 62/89 |

Primary Examiner—William E. Tapolcai
Attorney, Agent, or Firm—D. R. Lackey

[57] ABSTRACT

A bus air conditioning unit suitable for roof mounting on either end of a bus, including a metallic frame which includes a condenser and a control panel as integral structural members. A removable cover reveals all components of the unit which are not mounted outside the frame, which components include two condenser fans and two evaporator blowers mounted on a common axis, permitting a single double ended electric motor to drive them. The condenser fans are selected to draw outside air through a condenser, and then exhaust the air out the axial ends of the unit, when the unit is front mounted, and they are selected to draw outside air into the axial ends and exhaust it through the condenser, when the unit is rear mounted.

11 Claims, 5 Drawing Sheets

FIG.I.

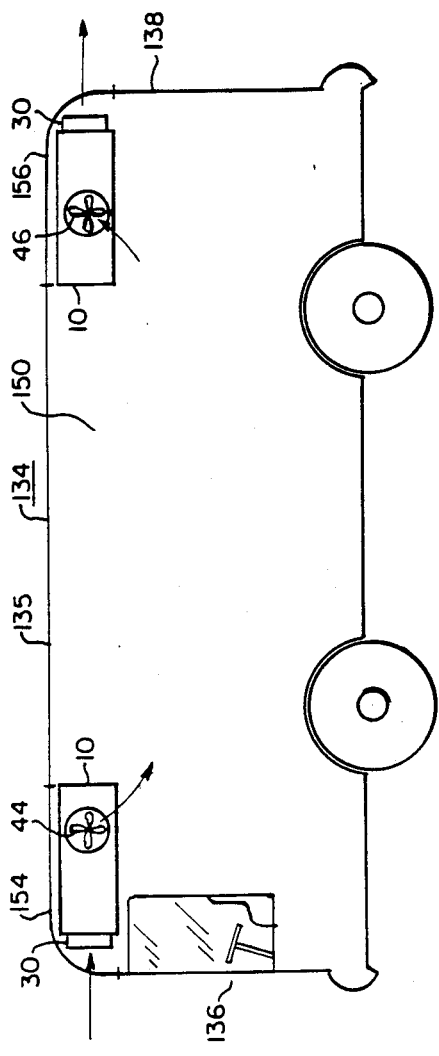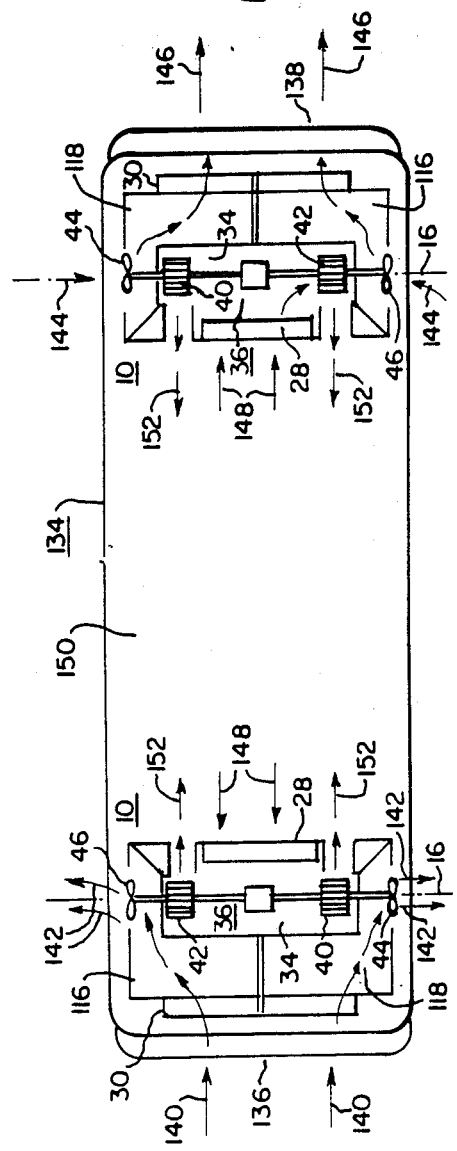

BUS AIR CONDITIONING UNIT

TECHNICAL FIELD

The invention relates in general to bus air conditioning units, and more specifically to air conditioning units suitable for mounting from the roof of a vehicle.

BACKGROUND ART

A large market has developed for small busses which travel at relatively low speeds over short distances, such as the shuttle busses used at airports between planes, terminals, car rentals, and the like. These shuttle busses are substantially less costly than the large highway busses, and it would be desirable to provide air conditioning units for such busses which are also less costly than units for the large busses, while maintaining reliability and serviceability.

SUMMARY OF THE INVENTION

Briefly, the present invention is a new bus air conditioning unit having a low height dimension, suitable for roof mounting on shuttle busses. The new bus air conditioning unit is less costly to manufacture, easier to service, and lighter in weight than conventional bus air conditioning units.

Instead of building a frame and mounting refrigeration components on the frame, certain of the refrigeration components, such as the condenser, control panel, motor mount and evaporator drain pan, are all integral structural members of the frame, reducing the weight and cost of the unit. The component layout permits a single electric motor to drive two evaporator blowers and two condenser fans, with space for two motors when the voltage of the bus electrical system requires two smaller motors. The fans and blowers are directly mounted to two shafts, which are coaxial with the axis of the drive motor.

The unit may be mounted on the front or rear end of the bus, on or just below the roof line, simply by selecting the condenser fan blades to either draw air into a condenser plenum, or to exhaust air from the condenser plenum. Refrigeration components which are not mounted outside the frame, are easily accessed for maintenance, simply by lifting a cover disposed on the frame. The components mounted outside the frame and the control panel are accessible from the end of the bus the unit is mounted on.

BRIEF DESCRIPTION OF THE DRAWINGS

The invention will become more apparent by reading the following detailed description in conjunction with the drawings, which are shown by way of example only, wherein:

FIG. 5 is an elevational view of a shuttle bus illustrating bus air conditioning units installed on or just below the roof of the bus, both front and rear, to illustrate that the unit may be mounted at either end of a bus; and FIG. 6 is a plan view of the bus shown in FIG. 5, illustrating condenser and evaporator air flow paths for font and rear mounted air conditioning units.

DESCRIPTION OF PREFERRED EMBODIMENTS

Figure 1:
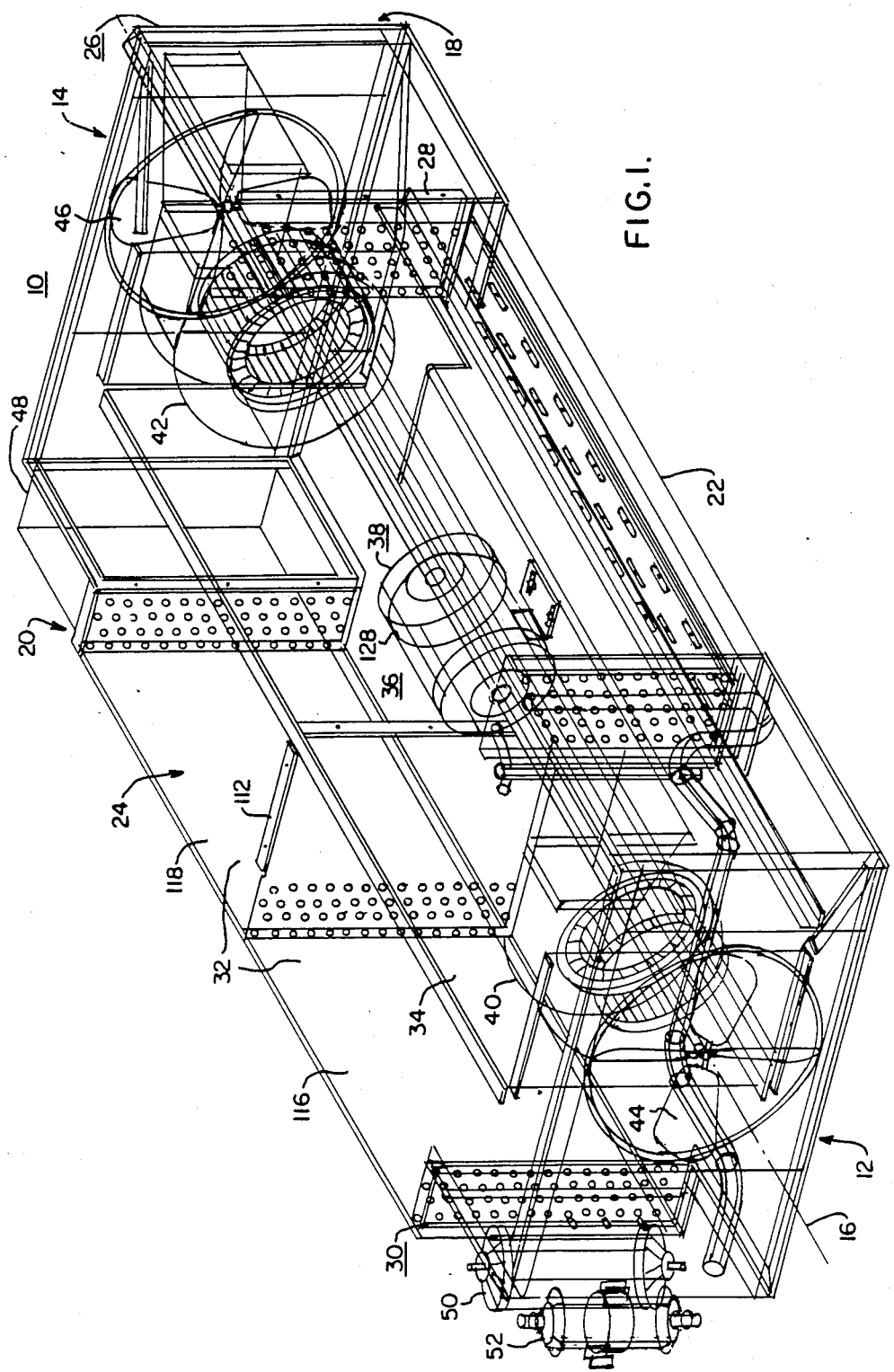
FIG. 1 is a perspective view of a bus air conditioning unit constructed according to the teachings of the invention.
Figure 2:
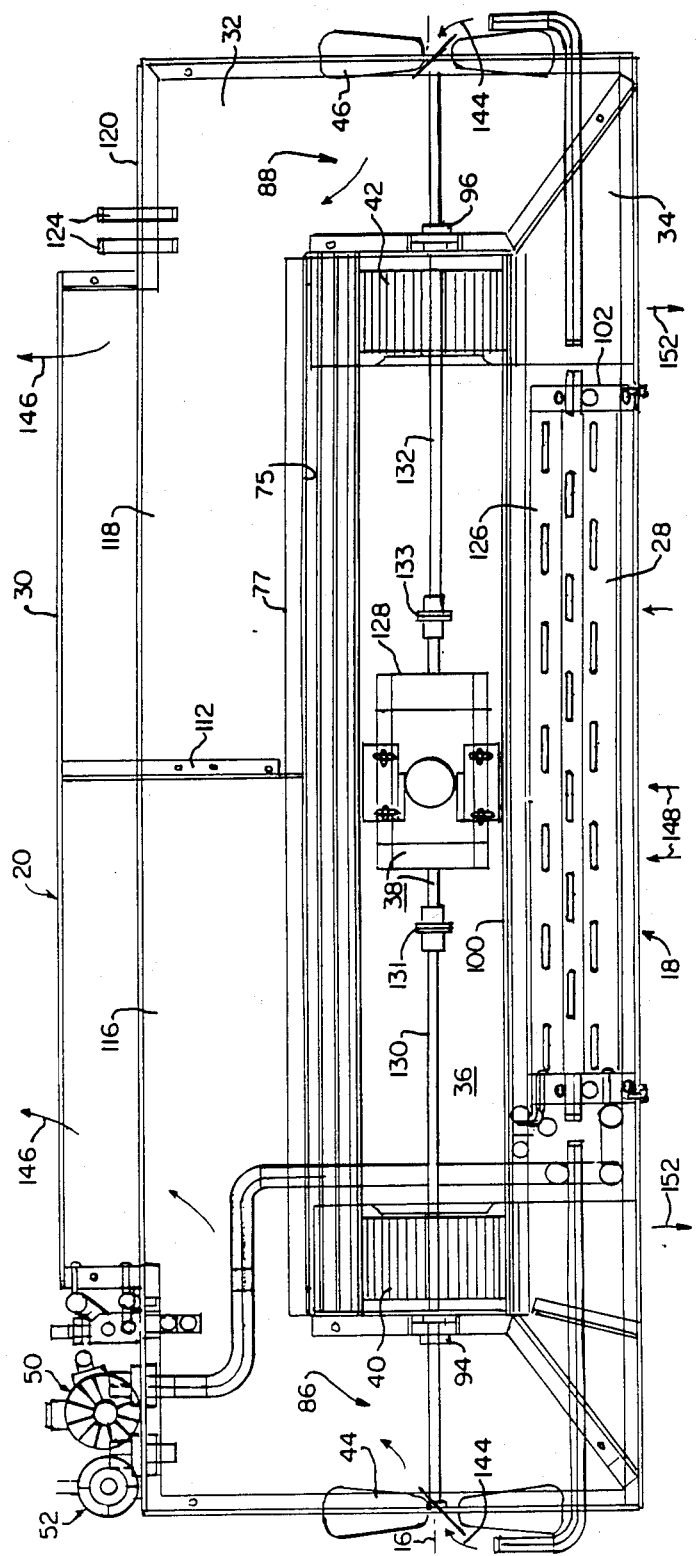
FIG. 2 is a plan view of the bus air conditioning unit shown in FIG. 1.
Figure 3:
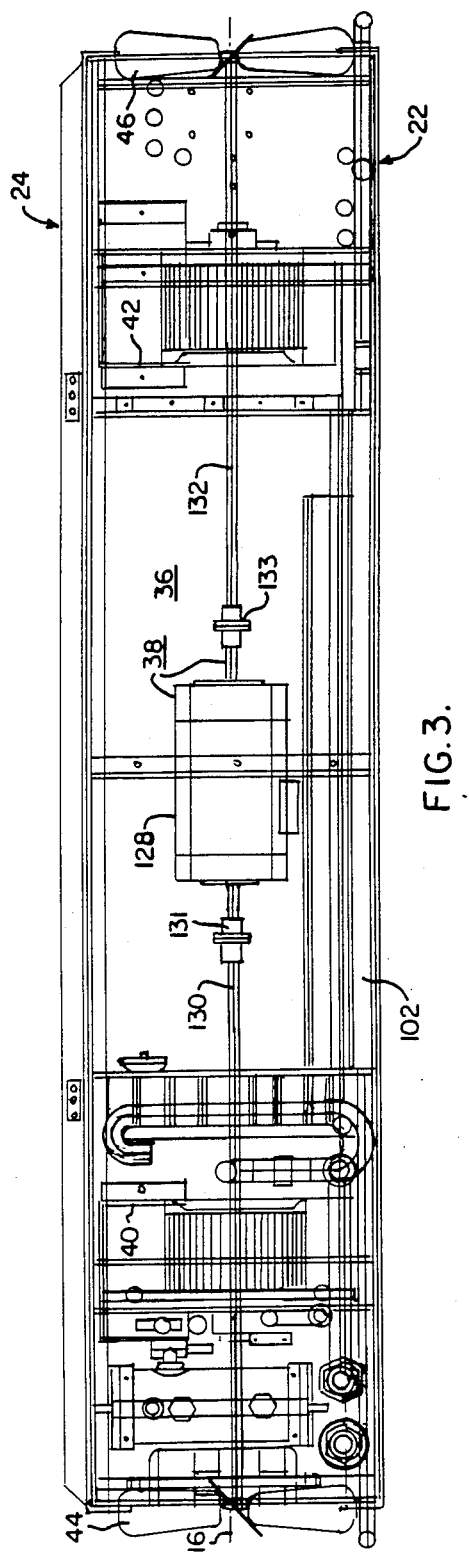
FIG. 3 is an elevational view of the bus air conditioning unit shown in FIGS. 1 and 2, taken from the evaporator side.

Referring now to the drawings, and to FIG. 1 in particular, there is shown a perspective view of a bus air conditioning unit 10 constructed according to the teachings of the invention. FIG. 2 is a plan view of unit 10, and FIG. 3 is an elevational view of an evaporator side of the unit 10. Unit 10 has first and second axial ends 12 and 14, respectively, a longitudinal axis 16 which extends between its ends, an evaporator side 18, a condenser side 20, a bottom 22 and a top 24. The condenser side 20 always faces outwardly from the end of the bus the unit 10 is installed on, i.e., the condenser side 20 faces outwardly from either the front or rear of a bus. The evaporator side 18 faces a served space inside the bus, and the axial ends 12 and 14 are on the sides of the bus. Unit 10 has a very low profile, about 14.8 inches (37.6 cm) high, permitting the bus to have a rear window, if required, and unit 10 has a total weight of only 336 pounds.

Unit 10 has an elongated metallic frame 26 primarily constructed of 0.1 inch (0.254 cm) thick aluminum, as will be hereinafter described in detail. Unit 10 further includes an evaporator coil 28, a condenser coil 30, condenser and evaporator plenums 32 and 34, an air delivery system 36 which includes electric motor and shaft means 38, first and second evaporator blowers 40 and 42, respectively, and first and second condenser fans 44 and 46, respectively. A control panel 4S, receiver tank 50 and dehydrator 52 essentially complete the unit 10.

Figure 4:
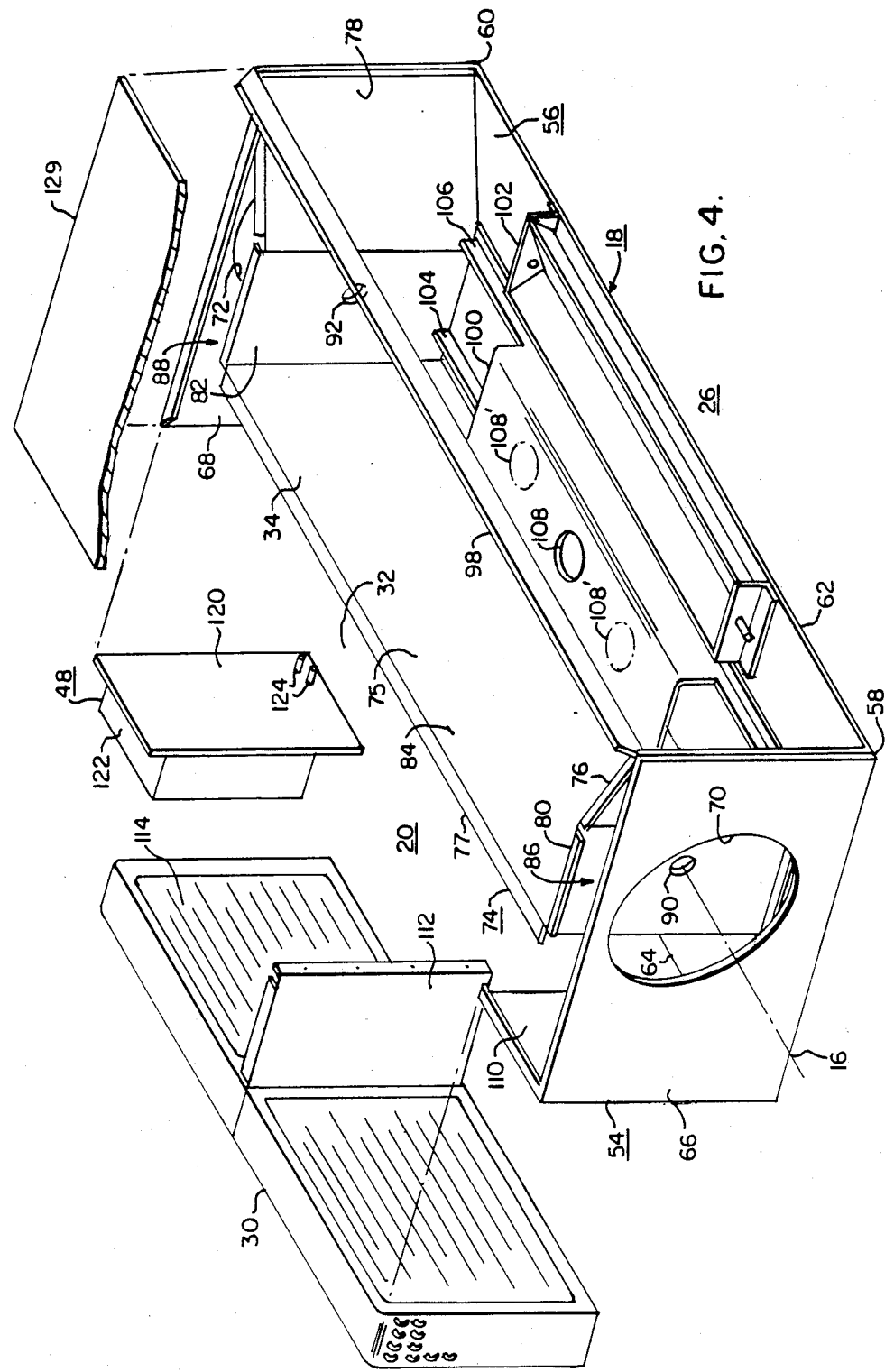
FIG. 4 is a partially exploded perspective view of the frame of the bus air conditioning unit shown in FIGS. 1, 2 and 3.

FIG. 4 is a partially exploded perspective view of frame 26. FIG. 4 illustrates the parts of frame 26 which are welded together as a unit or weldment 54 in their normal positions, and the parts which are bolted to the weldment 54 are illustrated in exploded positions. As hereinbefore stated, all members of weldment 54 are constructed of 0.1 inch (0.254 cm) thick aluminum.

More specifically, weldment 54 includes a flat sheet base member 56 having first and second axial ends 58 and 60, respectively, and first and second lateral sides or edges 62 and 64, respectively, which extend between the axial ends 58 and 60. First and second upstanding end members 66 and 68 are welded to the first and second ends 58 and 60 of base member 54, with end members 66 and 68 defining circular openings 70 and 72, respectively, which are concentric with longitudinal axis 16.

An upstanding bulkhead 74 is fixed to base member 56, which divides unit 10 into the hereinbefore mentioned condenser and evaporator plenums 32 and 34, respectively. Bulkhead 74 has first and second major sides 75 and 77, respectively, with the first side facing the evaporator plenum 34, and with the second side facing the condenser plenum 32. Bulkhead 74 includes first, second, third, fourth and fifth portions 76, 78, 80, 82 and 84, respectively. The first and second portions 76 and 78 start at the first edge 62 of base member 56, directly adjacent to, and welded to, upstanding end members 66 and 68, respectively. The first and second portions 76 and 78 then angle inwardly at an angle of about 54 degrees relative to the upstanding end members 66 and 68 where they respectively join the third and fourth portions 80 and 82. The third and fourth portions 80 and 82 are in spaced parallel relation with the upstanding end members 66 and 68 respectively, forming fan pockets 86 and 88 adjacent axial ends 58 and 60, respectively, of base member 56. The third and fourth portions 80 and 82 define openings 90 and 92 coaxial with axis 16 for mounting shaft bearings 94 and 96, respectively, shown in FIG. 2. The remaining upright ends of the third and fourth portions 80 and 82 are joined by the fifth portion 84, to complete the evaporator/condenser bulkhead 74.

The evaporator side 18 of weldment 54 is completed by an angle member 98 which is vertically spaced above edge 62 of base 56, extending between the axial ends 12 and 14 of unit 10. One end of angle member 98 is welded to the joining ends of upstanding end member 66 and portion 76 of bulkhead 74, and the remaining end is welded to the joining ends of upstanding end member 68 and portion 78 of bulkhead 74.

The flat sheet metal of base member 56 is stiffened by welding an electric motor mount 100 and an evaporator drain pan 102 to base member 56. The motor mount 100 is channel shaped with flanged legs. A portion of the channel configuration is removed adjacent each end, i.e., the bight and a portion of the legs, to provide room for evaporator blowers 40 and 42, while retaining stiffening support via the integrally extending angle shaped flanged end portions which remain, such as the integrally extending angle portions indicated at 104 and 106 on one end of motor mount 100, and like angle portions at the other end. An opening 108 for electrical motor leads is centrally provided when one electric motor is used. With two electric motors, opening 108 would not be required, and openings 108' would be provided where indicated in phantom.

The condenser side 20 of weldment 56 is not structurally complete. The condenser side 20 of weldment 56 includes only a short upstanding member 110, which is preferably a continuation of upstanding end member 66. Condenser 30 and control panel 48, when bolted to weldment 56, complete the physical integrity of frame 26.

Condenser 30, in a preferred embodiment of the invention, is constructed with an intermediate header plate 112 which extends perpendicularly outward from a inner vertical plane or surface 114. The extension of the intermediate header plate 112 has a length dimension selected such that it may be bolted to the bulkhead 74. This provides additional stiffening to frame 56; and, it also divides the condenser plenum 32 into first and second isolated sections 116 and 118, respectively, best shown in FIGS. 1 and 2, to prevent the condenser fans 44 and 46 from bucking one another.

Control panel 48 includes a flat sheet metal back portion 120 which provides structural support for frame 26, with all control items being mounted on back portion 120, within an enclosing structure 122 bolted to portion 120. Hot coolant from a radiator of an associated bus may be connected to the external sides of tubes 124 disposed through portion 120, with the internal ends of the tubes 124 being connected to a section 126 of evaporator coil 28 used to provide heat for the associated bus when required, as best shown in FIG. 2.

A cover 129 is removably fixed to the top 24 of unit 10. Simply removing or pivoting a cosmetic cover, as shown in FIG. 5, and then removing or pivoting the unit cover 129, provides access to all components, except receiver 50 and dehydrator 52, which are accessible as soon as the cosmetic cover is displaced.

Motor and shaft means 38 in a preferred embodiment of the invention includes a single double ended electric motor 128 mounted on motor mount 100. Motor 128 is coupled to first and second shafts 130 and 132 via couplings 131 and 133, respectively. Shaft 130, which is rotatably supported by bearing 94, directly drives evaporator blower 40 and condenser fan 44. Shaft 132, which is journaled for rotation by bearing 96, directly drives evaporator blower 42 and condenser fan 46. When the voltage provided by the electrical system of the associated shuttle bus is insufficient to drive the connected load, two electric motors may be provided, each coupled to a different one of the shafts 130 and 132.

FIGS. 5 and 6 are elevational and plan views of a bus 134 illustrating in flow paths relative to placement of an air conditioning unit 10 on, or just under the roof line 135, at the front 136 of bus 134, and on or just under the roof line 135 at the rear 138 of bus 134.

When unit 10 is to be placed at the front 136 of a bus 134, condenser fans 44 and 46 are configured to draw outside air, indicated by arrows 140, into condenser plenum sections 116 and 118 through condenser 30, and to exhaust the heated air, indicated by arrows 142 out the sides of unit via openings 70 and 72.

When unit 10 is to be placed at the rear 138 of bus 134, condenser fans 44 and 46 are configured to draw outside air, indicated by arrows 144, directly into plenum sections 116 and 118 via openings 70 and 72, and to force the air through condenser 30, exhausting heated air, indicated by arrows 146, from the rear plane of bus 134, instead of from the side planes.

In either position of unit 10, the evaporator air flow is the same, with blowers 40 and 42 being arranged to draw air, indicated by arrows 148, from a served space 150, i.e., the inside of bus 134, and into the evaporator plenum 34 via the evaporator 28. The conditioned air, indicated by arrows 152, is forced into ducts (not shown) aligned with the outlets of blowers 40 and 42 for distribution throughout the served space 150.

Unit 10 is readily serviced from the end of the bus 134 the unit 10 is associated with, with authorized personnel gaining access to unit 10 by lifting a cosmetic cover 154 at the front 136, or a cosmetic cover 156 at the rear 138 of bus 134.

I claim:

1. A bus air conditioning unit suitable for roof mounting adjacent either the front or rear of a bus, comprising:

an elongated metallic frame having a base which includes first and second axial ends, and first and second sides which extend between said first and second axial ends, said frame further including first and second upstanding end members, fixed to the first and second axial ends, respectively, of said base, and an upstanding bulkhead fixed to said base, said upstanding bulkhead dividing said base into evaporator and condenser plenums, with said bulkhead having first and second sides which respectively face said evaporator and condenser plenums, said upstanding bulkhead having first, second, third, fourth and fifth portions, with said first and second portions angling outwardly from the first and second upstanding end members, respectively, starting at the first side of the base, said first and second portions respectively joining said third and fourth portions which are disposed in spaced parallel relation with the first and second upstanding end members, respectively, to define condenser fan pockets on the second side of the bulkhead, adjacent to the first and second axial ends of the base, said fifth portion interconnecting the third and fourth portions, a condenser, and a control panel, said condenser and control panel extending serially along the second side of the base, and forming structural elements of the frame.

2. The bus air conditioning unit of claim 1 wherein the condenser includes an intermediate header which is extended towards and fixed to the second side of the bulkhead, to add additional stiffening to the frame, and to divide the condenser plenum into first and second isolated sections.

3. The bus air conditioning unit of claim 1 including a motor mount fixed to the base in the evaporator plenum, which adds stiffening to the frame, and motor and shaft means supported by said motor mount.

4. The bus air conditioning unit of claim 1 including an evaporator drain pan fixed to the base in the evaporator plenum, which adds stiffening to the frame, and an evaporator mounted on said evaporator drain pan.

5. The bus air conditioning unit of claim 1 including:

a motor mount fixed to the base in the evaporator plenum, which adds stiffening to the frame, motor and shaft means supported by said motor mount, bearing means journaling the shaft means of said motor and shaft means through the third and fourth portions of the bulkhead, and air delivery means fixed to said shaft means on both the first and second sides of the third and fourth portions of the bulkhead, with the air delivery means on the first side being evaporator air delivery means, and with the air delivery means on the second side being condenser air delivery means.

6. The bus air conditioning unit of claim 5 including:

an evaporator drain pan fixed to the base in the evaporator plenum, which adds stiffening to the frame, and an evaporator mounted on said evaporator drain pan, and wherein the evaporator air delivery means draws air from a served space and into the evaporator plenum through the evaporator and then discharges it back into the served space.

7. The bus air conditioning unit of claim 5 wherein the first and second upstanding end members each define an opening through which condenser air passes, with the condenser air delivery means being arranged to draw air into the condenser plenum via said condenser air openings when the bus air conditioning unit is mounted adjacent to the rear of a bus, and to discharge air from the condenser plenum via said condenser air openings when the bus air conditioning unit is mounted adjacent to the front of a bus.

8. The bus air conditioning unit of claim 5 wherein the motor and shaft means includes a single double ended motor coupled to first and second shafts.

9. The bus air conditioning unit of claim 1 wherein the frame includes an angle member fixed to the first and second upstanding members such that the angle member is vertically spaced above the first side of the base.

10. The bus air conditioning unit of claim 1 including an upstanding member fixed to the second side of the base, in series with the condenser and control panel, to complete the frame on the second side of the base.

11. The bus air conditioning unit of claim 1 including a cover removably mounted on the frame, the removal of which provides access to components mounted on the frame.

* * * * *